(12) United States Patent
Wang

(10) Patent No.: US 11,338,736 B2
(45) Date of Patent: May 24, 2022

(54) CAR LATCH PEDAL

(71) Applicant: Ningbo Tuoluzhe Auto Accessories Co., Ltd., Ningbo (CN)

(72) Inventor: Baorong Wang, Ningbo (CN)

( * ) Notice: Subject to any disclaimer, the term of this patent is extended or adjusted under 35 U.S.C. 154(b) by 72 days.

(21) Appl. No.: 17/022,022

(22) Filed: Sep. 15, 2020

(65) Prior Publication Data

US 2021/0347302 A1 Nov. 11, 2021

(30) Foreign Application Priority Data

May 6, 2020 (CN) .......................... 202010374578.9

(51) Int. Cl.
*B60R 3/00* (2006.01)
*B60D 1/58* (2006.01)

(52) U.S. Cl.
CPC ............... *B60R 3/007* (2013.01); *B60D 1/58* (2013.01)

(58) Field of Classification Search
CPC .................................................... B60R 3/007
See application file for complete search history.

(56) References Cited

U.S. PATENT DOCUMENTS

| | | | | |
|---|---|---|---|---|
| 6,340,189 B1 * | 1/2002 | Pordy | ............... | B60N 3/023 16/110.1 |
| 6,574,833 B1 * | 6/2003 | Tomaiuolo | ............ | B60N 3/026 16/110.1 |
| 6,584,643 B1 * | 7/2003 | Tomaiuolo | ............ | B60N 3/026 16/110.1 |
| 6,799,353 B1 * | 10/2004 | Stewart | ................. | B60N 3/026 16/422 |
| 9,296,323 B2 * | 3/2016 | Voisin | .................... | B60N 3/026 |
| 9,403,466 B1 * | 8/2016 | Deng | ..................... | B60R 22/32 |
| 10,723,273 B1 * | 7/2020 | Gray | ........................ | B60R 3/02 |
| 2005/0133078 A1 * | 6/2005 | Fujitsubo | .............. | B60N 3/023 135/72 |
| 2018/0194290 A1 * | 7/2018 | Lewis | .................... | B60R 3/007 |
| 2019/0329710 A1 * | 10/2019 | Mao | ........................ | B60R 3/005 |

* cited by examiner

*Primary Examiner* — Bryan A Evans
(74) *Attorney, Agent, or Firm* — Rumit Ranjit Kanakia

(57) ABSTRACT

This invention relates to an auxiliary tool for automobiles, particularly a car latch pedal including a pedal. The pedal comprises a bottom clamp groove and a first connecting hole at one end; The bracket has a hook on one side of the end and a adjusting hole on the other side of the same end. The hook is hung on the car latch and the first pin is fixed on the first connecting hole. The adjusting hole of the bracket is inserted in the first pin, and the bottom clamp groove is positioned beneath the car latch, pressed on the car latch by using the first pin as the pivot. The car latch is positioned between the hook and the bottom clamp groove. The elastic block is fixed at the other end of the bracket. Small in size, the car latch pedal can be conveniently carried around by cars. Fixing the car latch at proper height will make it convenient to stably load or unload items at the car roof. The angle of the car latch can be adjusted to remain horizontal, avoiding damages to car paints or deformations of door frames.

10 Claims, 8 Drawing Sheets

CAR LATCH PEDAL

TECHNICAL FIELD

This invention relates to an auxiliary tool for automobiles, particularly a car latch pedal.

BACKGROUND ART

When loading items onto SUVs or cars with higher roofs, a ladder or a chair is usually used to assist the process, which is very inconvenient. If the ladder or the chair is carried inside the car, the inner space will be constricted; but if the ladder is tied to the car body, it will damage the paint. Although it is always an option to carry a foldable chair, it doesn't have enough strength to bear the weight of an adult or carry heavy objects without breaking apart. Its instability also imposes safety risks, and its low height makes it inconvenient for unloading items from the car roof. In general, a foldable chair is not an ideal choice in real scenarios.

SUMMARY OF THE INVENTION

In order to solve the above-mentioned problems, the present invention provides a car latch pedal with a small size that can be conveniently carried in cars; It is fixed by the car latch to achieve proper height for convenient loading and unloading of items onto or from car roof. It has good stability to avoid damages to the paint or deformations in car frames. The following technical solutions are adopted:

A car latch pedal is comprised of: a pedal, with a bottom clamp groove and a first connecting hole at one end; a bracket, with a hook on one side of one end and an adjusting hole on the other side of the same end. The hook is hung on the car latch; a first pin, fixed on the first connecting hole. The adjusting hole of the bracket is inserted in the first pin, and the bottom clamp groove is positioned beneath the car latch, pressed on the car latch by using the first pin as the pivot. The car latch is positioned between the hook and the bottom clamp groove; elastic blocks, fixed at the other end of the bracket.

By adopting the above-mentioned technical solutions, the hook is hung from the top of the car latch; the bottom clamp groove of the pedal is pressed onto the latch from the bottom of it; the first pin is used as a rotation pivot; the bracket is hung onto the car latch via the hook; the elastic blocks are pressed against the door frame; the first pin and the car latch support the pedal together; when pressure is applied to the pedal, the bottom clamp groove is pressed onto the car latch; the lower clamp and the hook are securely linked with the car latch with elastic blocks pressed against the door frame to ensure the stability of the pedal; since the position of the car latch is usually positioned at the lower middle of the car height, people can conveniently load and unload the items onto or from the car roof when treading on the pedal.

The elastic blocks are used for protecting the door frame, increasing the contact area with the door frame while realizing flexible connection to avoid any deformations of the door frame or damages to the paint of the door frame.

When not in use, the bracket can be stowed under the pedal to greatly reduce the occupation space, easy for carrying.

Further, a car latch pedal also comprises a second pin, fixed on the second connecting hole at the other end of the bracket with elastic blocks rotationally fixed on the second pin; the elastic blocks are equipped with at least two adjusting surfaces for adjusting the horizontal state of the pedal.

By adopting the above-mentioned technical solutions, the elastic blocks are rotatable, and the different adjusting surfaces of each elastic block are pressed onto the door frame; because the adjusting surfaces are used for adjusting the distance between the first pin and the door frame, they can be used to adjust the horizontal state of the pedal since the distance varies between the surfaces and the first pin. In this way, the pedal can remain as horizontal as possible, which makes it convenient for people to stand, and avoid hurt to the feet or unsteadiness.

Further, there are two adjusting surfaces, namely a high adjusting surface and a low adjusting surface. The high adjusting surface is further away from the second pin than the low adjusting surface.

By adopting the above-mentioned technical solutions, the regular setting of the two adjusting surfaces is suitable for most of the car models on the market; adjusting fewer surfaces will ensure enough contact area with the door frame to avoid deformed door frames.

Further, elastic blocks are equipped with a plurality of elastic holes, annularly fixed around the axis of the elastic block.

Further, an adjusting hole is internally equipped with at least two adjusting grooves for adjusting the horizontal state of the pedal.

By adopting the above-mentioned technical solutions, the adjusting grooves are used for adjusting the horizontal state of the pedal, so that the pedal remains horizontal, which is convenient for use.

Further, two adjusting grooves are installed, namely the first adjusting groove and the second adjusting groove which are positioned at the same side of the adjusting hole.

Further, the pedal comprises an antiskid plate with a plurality of antiskid protrusions; supporting plates, whose one end is equipped with a bottom clamp groove and a first connecting hole; the supporting plates are symmetrically fixed on both sides of the antiskid plate, and the bracket is positioned between the two supporting plates.

By adopting the above-mentioned technical solutions, the bracket is positioned between the two supporting plates, ensuring high stability and safety. The antiskid plate is used for treading and fixing the supporting plates, which is convenient for the processing of the pedal.

Further, the top of the supporting plate is provided with an upper hem linked with the antiskid plate; the bottom of the supporting plate is provided with a lower hem.

By adopting the above-mentioned technical solutions, the upper hem is used for fixing the antiskid plate; the upper and the lower hem also increased the strength of the supporting plate to protect it from deformation.

The antiskid plate is provided with a punching groove.

By adopting the above-mentioned technical solutions, the punching groove is press-formed to increase the strength of the antiskid plate.

Further, a car latch pedal also comprises a reinforcing plate with a bottom clamp groove and a third connecting hole at one end; the reinforcing plate is fixed at one end of the supporting plate, and symmetrically positioned on both sides of the bracket.

By adopting the above-mentioned technical solutions, the reinforcing plate is thick enough to avoid deformation during use while reducing the thickness of the supporting plate, which is convenient for the processing of the supporting plate. The whole weight is reduced as well.

Further, one end of the first pin is provided with a limit post, and the other end with a screw.

By adopting the above-mentioned technical solutions, the first pin is provided with a screw hole for conveniently installing the screw. The limit post and the screw are used for fixing the first pin.

Compared with the prior art, the present invention has the following beneficial effects:

1. The angle of the pedal can be adjusted according to the inclining degree of the door frame, so that the angle of the pedal always keeps parallel with the ground.

2. The elastic blocks are in contact with the door frame, increasing the contact area between elastic blocks and car body, so as to reduce damage to the car body.

3. The two elastic blocks can be adjusted to different angles to adapt to various door frames on the market.

4. The pedal is more stably and securely installed on the car latch by the upper and lower occlusal structure, so that the pedal will not fall off 5. The treading surface is flat but higher, making it more convenient for operations at the car roof 6. Easy for use and light, the pedal can be folded for storage in the car glove box when not in use.

DETAILED DESCRIPTION OF THE PREFERRED EMBODIMENTS

Figure 1:
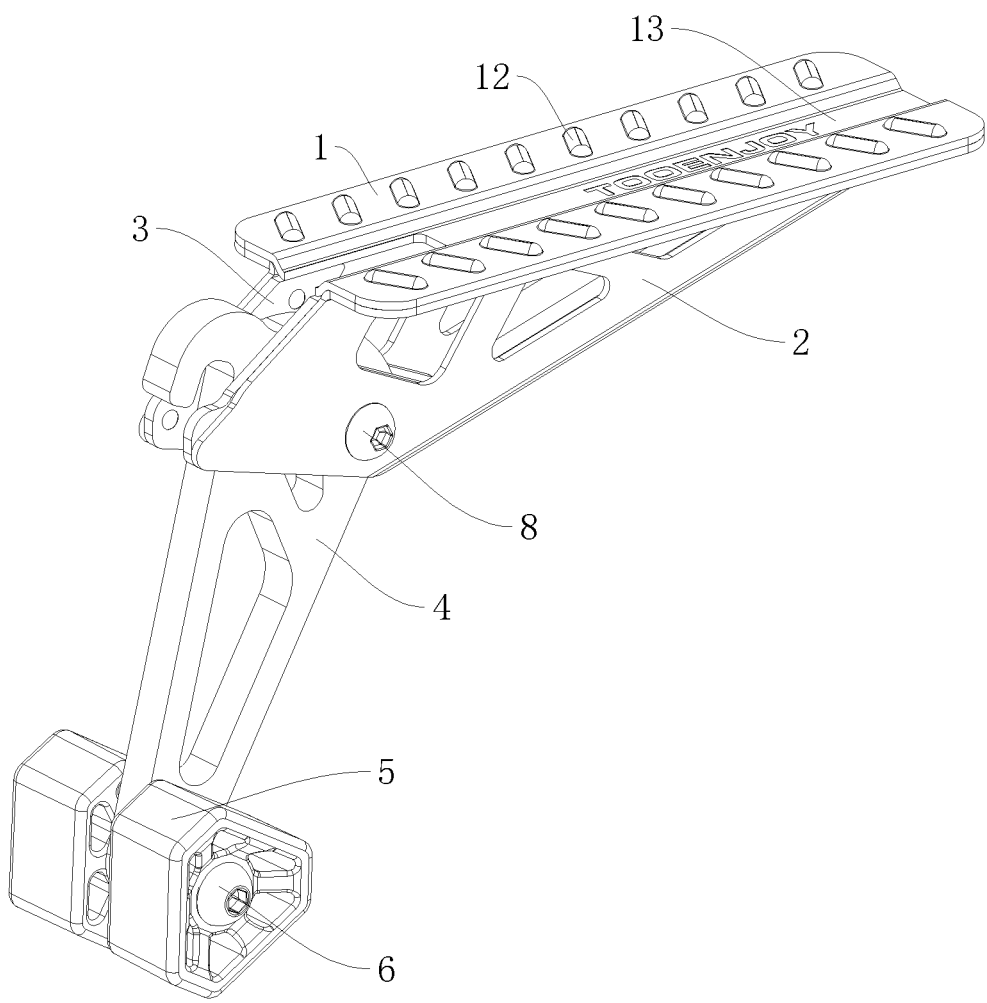
FIG. 1 is a structure schematic view of the car latch pedal.
Figure 2:
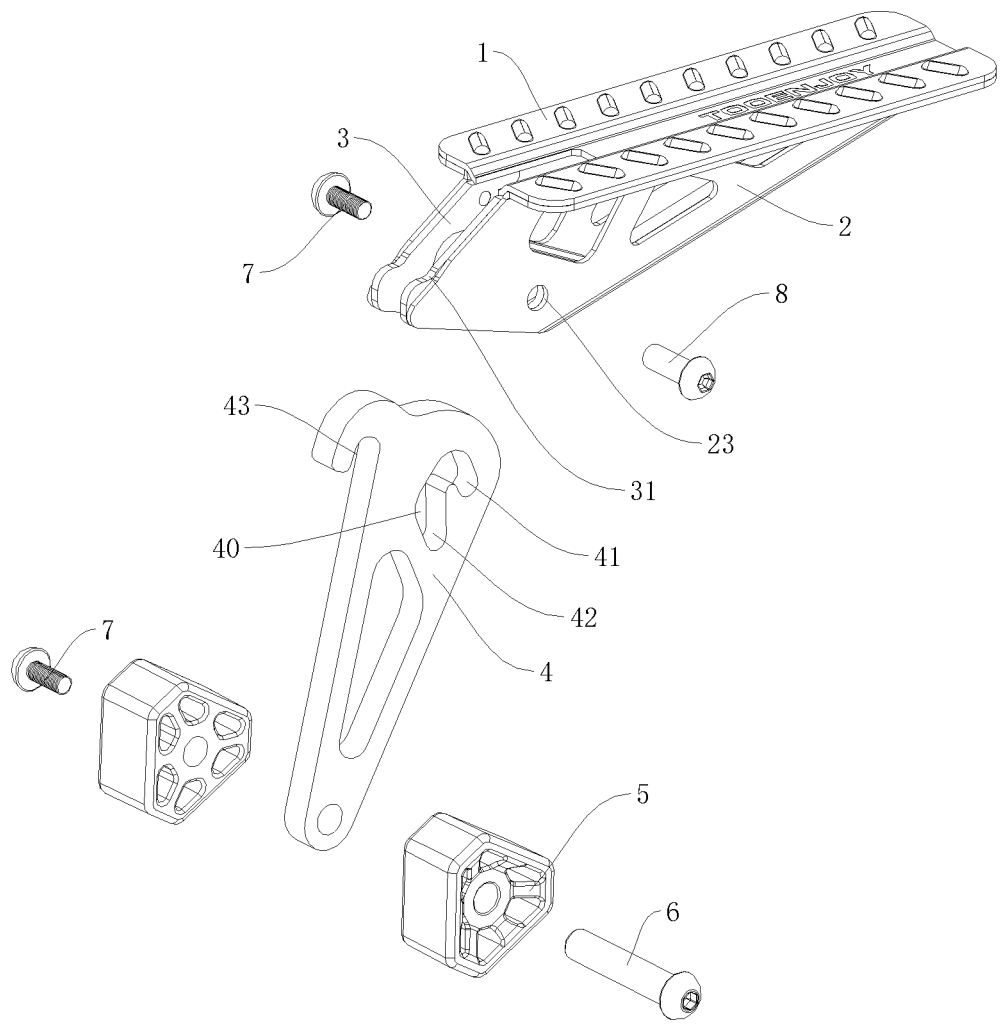
FIG. 2 is an exploded view of the car latch pedal.
Figure 3:
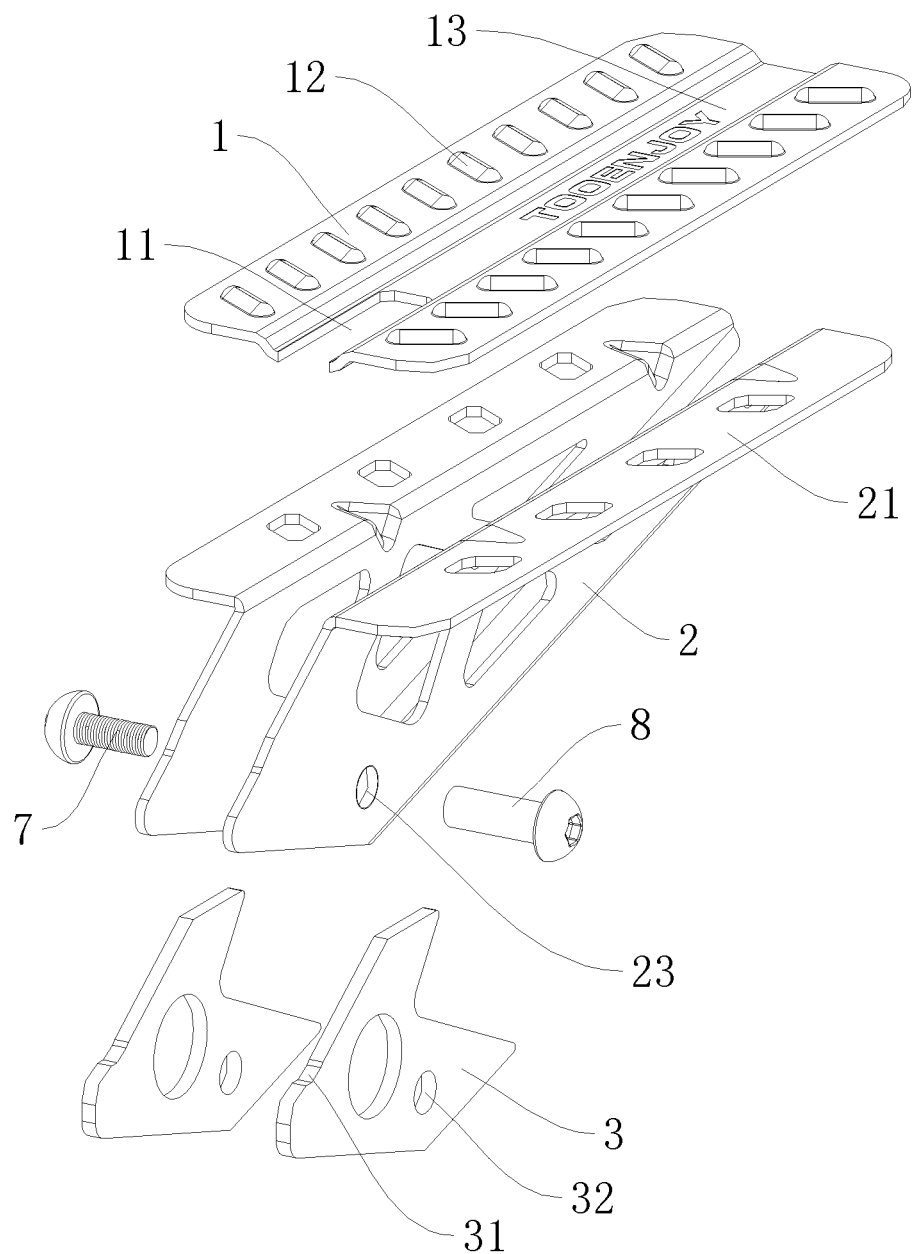
FIG. 3 is an exploded view of the pedal.
Figure 4:
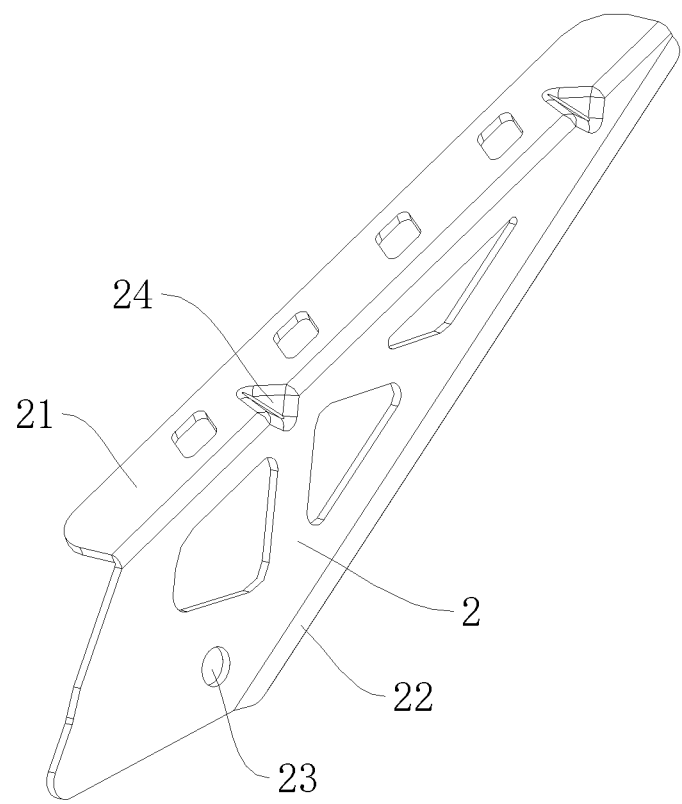
FIG. 4 is a structure schematic view of the supporting plate.
Figure 5:
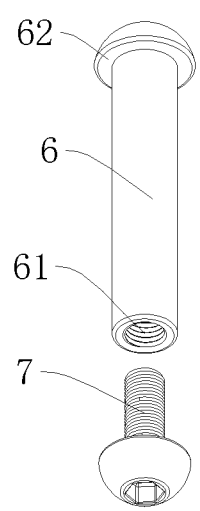
FIG. 5 is a structure schematic view of the first pin.
Figure 6:
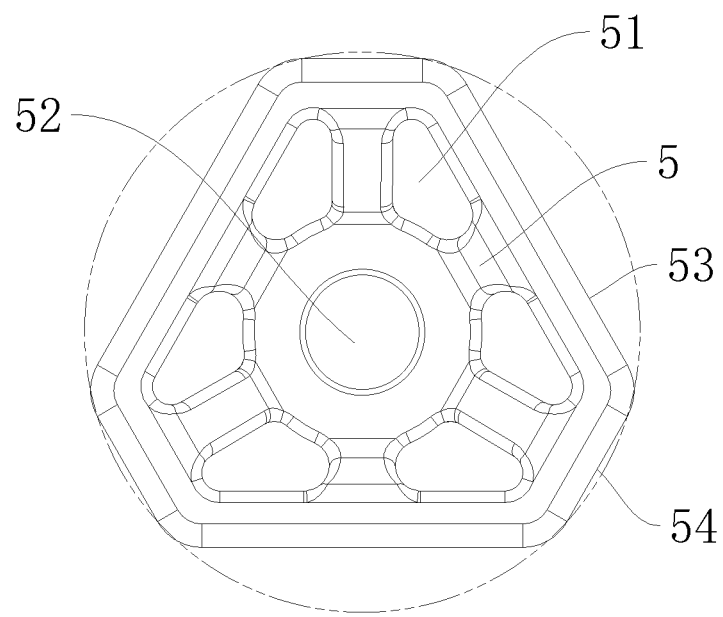
FIG. 6 is a structure schematic view of the elastic blocks.

The present invention will be further described with reference to the accompanying drawings.

Embodiment 1

As shown in FIG. 1 to FIG. 10, a car latch pedal comprises a pedal, with a bottom clamp groove 31 and a first connecting hole 23 at one end; a bracket 4, with a hook 43 on one side of one end, and an adjusting hole 40 on the other side of the same end, and the hook 43 is hung onto a car latch 92; a first pin 8, fixed on the first connecting hole 23, while the adjusting hole 40 of the bracket 4 is movably inserted into the first pin 8, the bottom clamp groove 31 is positioned under the car latch 92 and is pressed on the car latch 92 by using the first pin 8 as a pivot, and the car latch 92 is positioned between the hook 43 and the bottom clamp groove 31; and elastic blocks 5, fixed at the other end of the bracket 4.

The hook 43 is hung from the top of the car latch 92; the bottom clamp groove 31 of the pedal is pressed onto the car latch 92 from the bottom of the car latch 92; the first pin 8 is used as a rotation pivot; the bracket 4 is hung onto the car latch 92 via the hook 43; the elastic blocks 5 are pressed against the door frame 91; the first pin 8 and the car latch 92 support the pedal together; when the pressure is imposed on the pedal, the bottom clamp groove 31 is pressed onto the car latch 92, the bottom clamp 31 and the hook 43 are reliably connected with the car latch 92, and the elastic blocks 5 are pressed against the door frame 91, in order to ensure the stability of the pedal; because the position of the car latch 92 is usually positioned at the lower middle position of the car height, people can conveniently load and unload the object at car roof when treading on the pedal.

The elastic blocks 5 are used for protecting the door frame 91, increasing the contact area with the door frame 91 while realizing flexible connection, and avoiding the deformation of the door frame 91 and the damage to the paint of the door frame 91. The elastic block 5 can be made of polyurethane or rubber.

When the car latch pedal is not used, the bracket 4 can bestowed at the bottom of the pedal to greatly reduce the occupation space, convenient for carrying.

Both ends of the first pin 8 are pivoted onto the first connecting hole 23, or fixed onto the first connecting hole 23 via nuts or screws, or welded onto the first connecting hole 23; or, one end of the first pin 8 is provided with a limit post 62, and the other end of the first pin 8 is provided with a screw 7. The first pin 8 is provided with a screw hole 61 for conveniently installing the screw 7. The limit post 62 and the screw 7 are used for fixing the first pin 8. The limit post 62 is provided with a hexagon shape inside for conveniently fixing the screw 7.

The car latch pedal is small in size, so that the car latch pedal can be conveniently carried by the car. The car latch pedal is fixed by the car latch 92, and the height is proper, which is convenient for loading and unloading the items from car roof with good stability and avoid damage to the paint of the car or deformation of door frame 91 is avoided, which is convenient for use.

Embodiment 2

On the basis of Embodiment 1, the horizontal state of the pedal can be adjusted by setting a plurality of adjusting surfaces of the elastic blocks 5. The car latch pedal also comprises a second pin 6, fixed on a second connecting hole 44 of the other end of the bracket 4, and the elastic blocks 5 are rotationally installed on the second pin 6; the elastic block 5 is provided with at least two adjusting surfaces for adjusting the horizontal surface of the pedal.

The center of the elastic block 5 is formed with a rotation hole 52; the rotation hole 52 is movably inserted to the second pin 6.

The elastic blocks 5 are rotated, and the different adjusting surfaces of the elastic blocks 5 are pressed onto the door frame 91; because the adjusting surfaces are used for adjusting the distance between the second pin 6 and the door frame 91, they can be used to adjust the horizontal state of the pedal since the distance varies between the surfaces and the second pin 6,so that the pedal can remain as horizontal as possible, which is convenient for people to stand without hurting the feet or unsteadiness caused by over large slopes.

The elastic block 5 is provided with circular or polygonal cross section. When the elastic block 5 is provided with the circular cross section, the outer circle surface is cut with plane to form the adjusting surface, and many adjusting surfaces keeping different axis distances with the rotation hole 52 can be cut as required in order to adjust the different angles. When the elastic block 5 is provided with the polygonal cross section, the distance between each side face and the axis of the rotation hole 52 is different in order to adjust the different angles.

This embodiment describes an elastic block 5 which is in a hexagonal prism shape and has two adjusting surfaces. The adjusting surfaces comprise a high adjusting surface 54 and a low adjusting surface 53 which are sequentially connected.

By adopting the above-mentioned technical solutions, the regular setting of the two adjusting surfaces is suitable for most of the car models on the market; adjusting surfaces with fewer setting options will ensure enough contact area with the door frame 91 to avoid deformed door frame 91. By setting a hexagonal prism shape, the adjusting surfaces are convenient to adjust.

The structure of the second pin 6 is the same as the structure of the first pin 8. The second pin 6 is fixed on the second connecting hole 44 via the screw 7.

The elastic block 5 is provided with a plurality of elastic holes 51 annularly fixed around the axis of the elastic block 5. The elastic holes 51 increase the deformation amount; when the pressure is imposed on the pedal, the distance between the second pin 6 and the door frame 91 is reduced, so as to slightly adjust the position of the pedal, and maintain the horizontal state of the pedal. The elastic hole 51 provides the other method for adjusting the horizontal state of the pedal.

Embodiment 3

On the basis of Embodiment 1, many adjusting grooves are used for adjusting the horizontal state of the pedal. The adjusting hole 40 is internally equipped with at least two adjusting grooves for adjusting the horizontal state of the pedal. The adjusting grooves are used for adjusting the horizontal state of the pedal, so that the pedal is maintained at the horizontal state, which is convenient for use.

Figure 7:
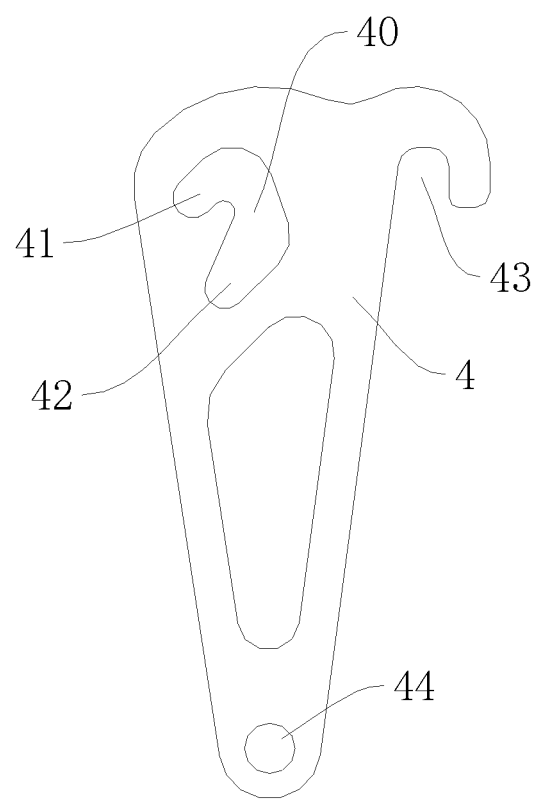
FIG. 7 is a front view of the bracket.
Figure 8:
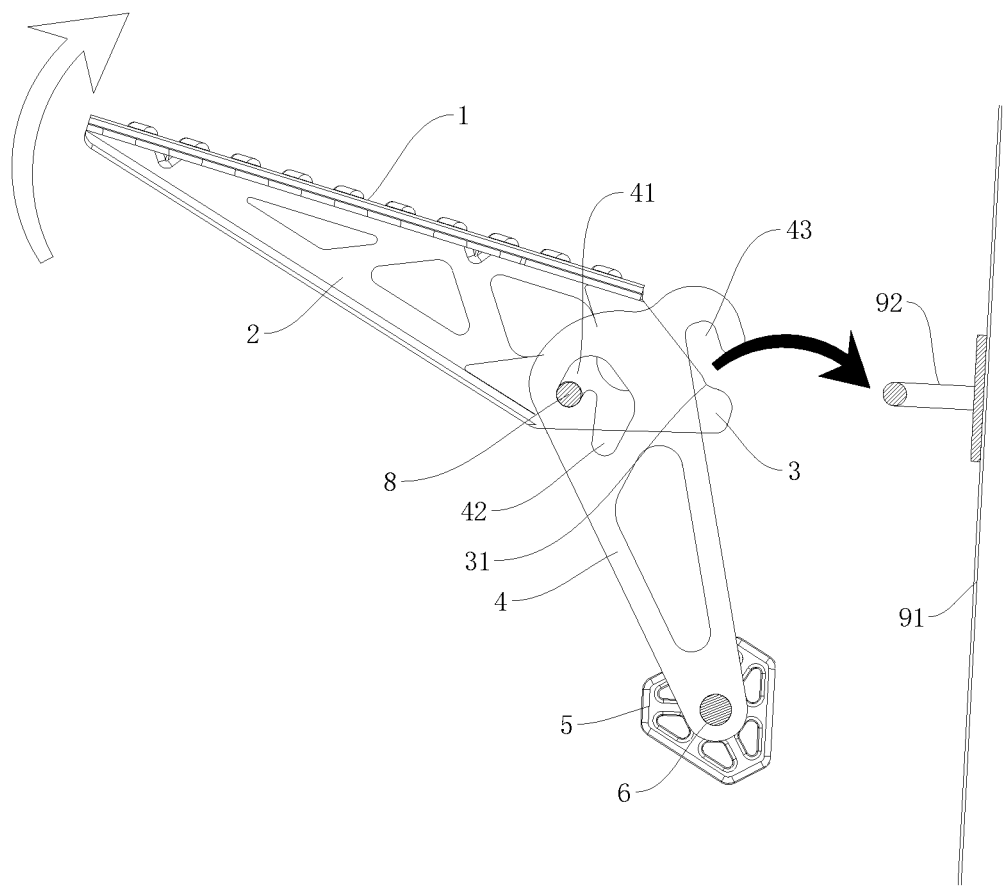
FIG. 8 is a schematic view when the car latch pedal is installed in the car latch.
Figure 9:
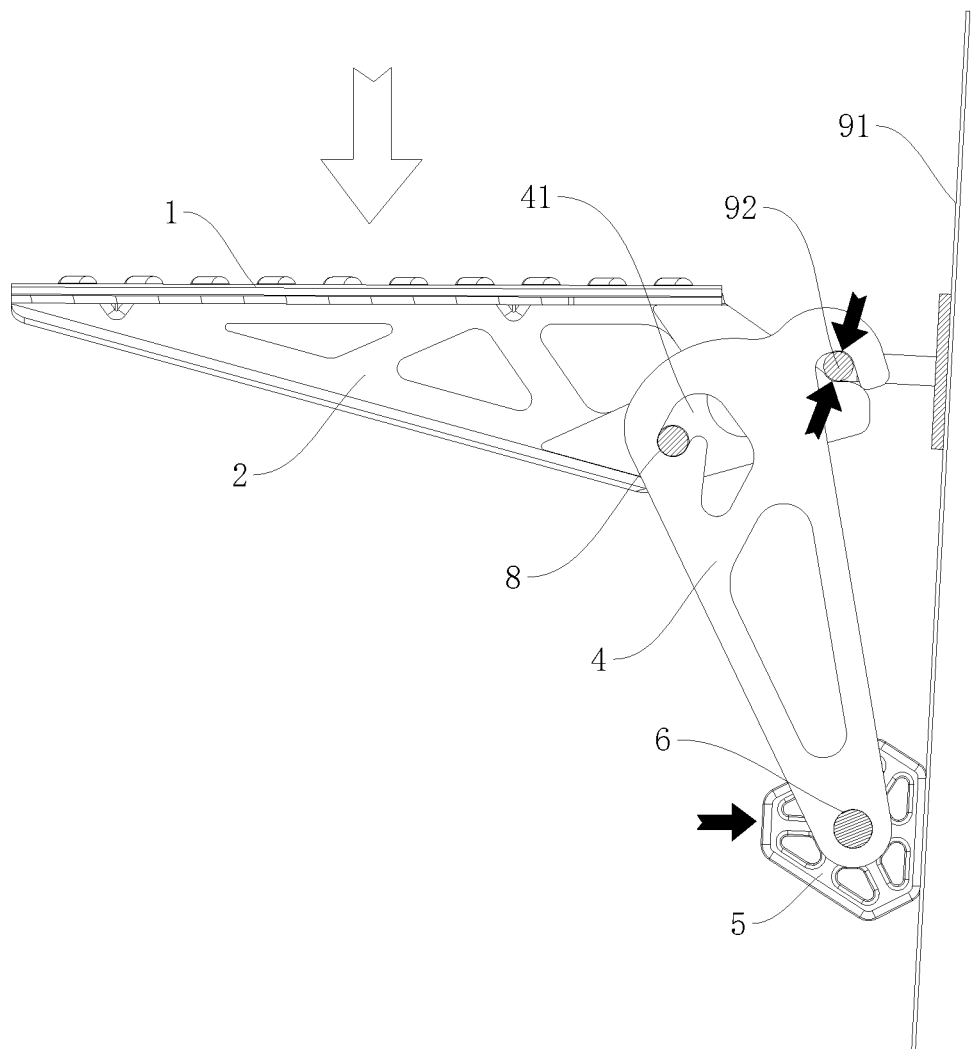
FIG. 9 is a schematic view when the car latch pedal is installed on the door frame with larger slope.
Figure 10:
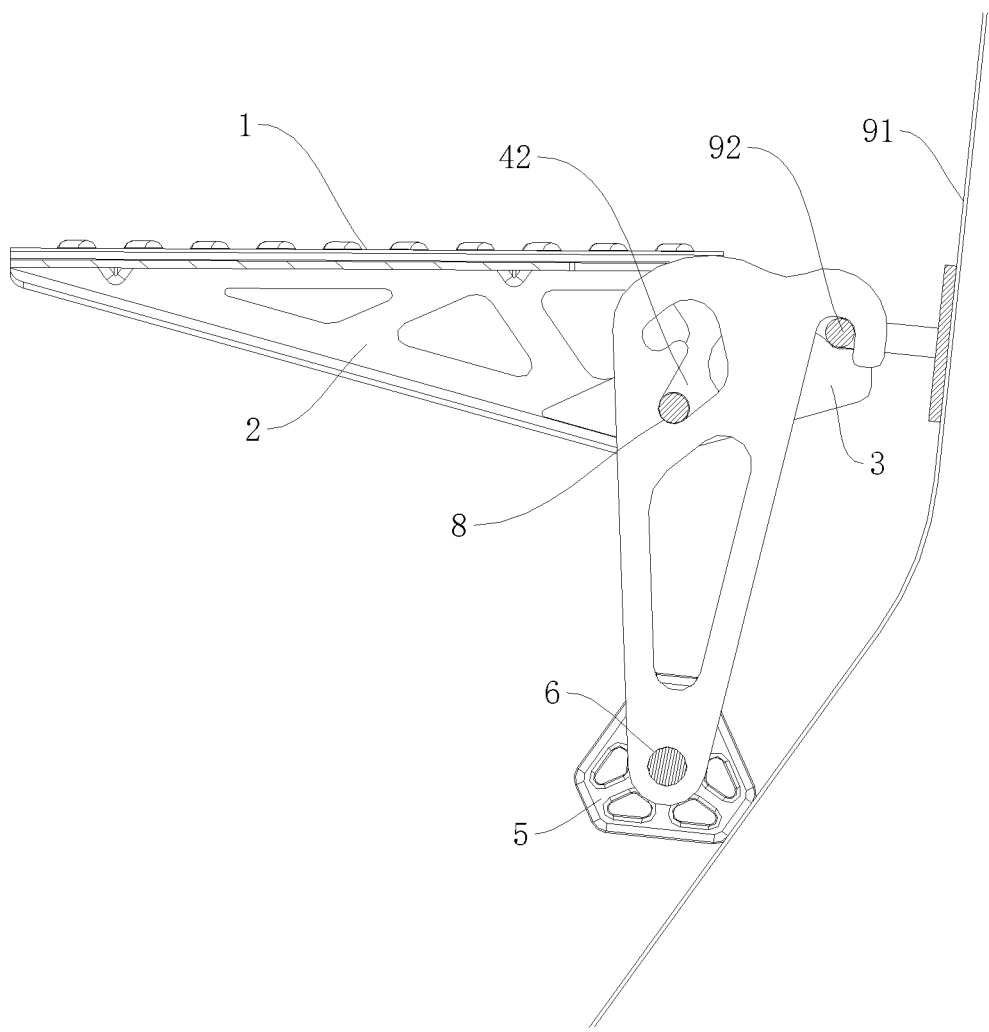
FIG. 10 is a schematic view when the car latch pedal is installed on the door frame with smaller slope.

A plurality of adjusting grooves can be set. This embodiment describes the setting manner of two adjusting grooves. Particularly, as shown in FIG. 7, the adjusting hole is internally equipped with a first adjusting groove 41 and a second adjusting groove 42, wherein the first adjusting groove 41 is positioned above the second adjusting groove 42; the first adjusting groove 41 and the second adjusting groove 42 are positioned at the same side of the adjusting hole 40.

The first pin 8 is set in the first adjusting groove 41 or the second adjusting groove 42 according to the horizontal state of the pedal. The first adjusting groove 41 is suitable for the door frame 91 with larger slope; the second adjusting groove 42 is suitable for the door frame 91 with smaller slope. The horizontal state of the pedal is adjusted by adjusting the position of the first pin 8 in the adjusting grooves.

Embodiment 4

On the basis of Embodiment 2, the horizontal state of the pedal is adjusted by setting a plurality of adjusting surfaces of the elastic block 5 and a plurality of adjusting grooves. The adjusting hole 40 is internally equipped with at least two adjusting grooves for adjusting the horizontal state of the pedal. The adjusting grooves are used for adjusting the horizontal state of the pedal, so that the pedal can maintain the horizontal state, which is convenient for use.

A plurality of adjusting grooves can be set. This embodiment describes the setting manner of two adjusting grooves. The adjusting hole is internally equipped with the first adjusting groove 41 and a second adjusting groove 42, wherein the first adjusting groove 41 is positioned above the second adjusting groove 42.

The first pin 8 is set in the first adjusting groove 41 or the second adjusting groove 42 according to the horizontal state of the pedal. The first adjusting groove 41 is suitable for the door frame 91 at larger slope; the second adjusting groove 42 is suitable for the door frame 91 at smaller slope. The horizontal state of the pedal is adjusted by adjusting the position of the first pin 8 in the adjusting grooves.

When the horizontal state of the pedal cannot be adjusted via the adjusting grooves, the elastic block 5 is rotated, and the horizontal position of the pedal is adjusted via the adjusting surfaces. The adjusting groove or the elastic block 5 is mainly used for adjustment, and flexible adjustments are made according to practical conditions.

The combination of adjusting surfaces and adjusting grooves can realize the adjusting of more angles to expand the application range and ensure the horizontal state of the pedal.

Embodiment 5

On the basis of any of the above embodiments, the pedal comprises an antiskid plate 1 having a plurality of antiskid protrusions 12; and supporting plates 2, wherein one end of the supporting plate 2 is provided with a lower clamp groove 31 and a first connecting hole 23, the supporting plates 2 are symmetrically fixed at both sides of the antiskid plate 1, and the bracket 4 is positioned between the two supporting plates 2.

The bracket 4 is positioned between the two supporting plates 2 so that the stability is good, and the safety is high. The antiskid plate 1 is used for treading, and is used for fixing the supporting plates 2, which is convenient for the processing of the pedal.

The top the supporting plate 2 is provided with an upper hem 21; the upper hem 21 is connected with the antiskid plate 1; the bottom of the supporting plate 2 is provided with a lower hem 22. The upper hem 21 is suitable for fixing the antiskid plate 1; the upper hem 21 and the lower hem 22 also increase the strength of the supporting plate 2 at the same time, so that the supporting plate 2 is not easily deformed. Triangular ribs 24 are installed between the upper hem 21 and the supporting plate 2, and are used for enhancing the strength of the upper hem 21 and reducing the stress deformation of the upper hem 21.

The antiskid plate 1 is provided with a punch groove 13 and is also provided with an avoidance groove 11. The punch groove 13 is formed by punching to increase the strength of the antiskid plate 1.

Embodiment 6

On the basis of Embodiment 5, the car latch pedal also comprises reinforcing plates 3, wherein one end of therein forcing plate 3 is provided with a bottom clamp groove 31 and a third connecting hole 32; the reinforcing plates 3 are fixed at one end of the supporting plate 2, and are symmetrically positioned at both sides of the bracket 4; the third connecting hole 32 is installed on the first pin 8.

The reinforcing plate 3 is thick enough to avoid deformation of the reinforcing plate during use, while reducing the thickness of the supporting plate 2, which is convenient for the processing of the supporting plate 2The whole weight is reduced as well.

Compared with the prior art, the present invention has the following beneficial effects:

1. The angle of the pedal can be adjusted according to the inclining degree of the door frame 91, so that the angle of the pedal always keeps parallel with the ground.

2. The elastic block 5 is in contact with the door frame 91 increasing the contact area between elastic blocks and car body, so as to reduce damage to the car body. 3. The two elastic blocks 5 can be adjusted to different angles to adapt to various door frames 91 on the market.

4. The pedal is more stably and securely installed on the car latch by the upper and lower occlusal structure, so that the pedal will not fall off.

5. The treading surface is flat but higher, making it more convenient for operations at the car roof 6. Easy for use and light, the pedal can be folded for storage, in the car glove box when not in use.

What is claimed is:

1. A car latch pedal, characterized by:
   a pedal, with a bottom clamp groove and a first connecting hole at one end;
   a bracket, with a hook on one side of one end and an adjusting hole on the other side of the same end, and the hook is hung on the car latch;
   a first pin, fixed on a first connecting hole, the adjusting hole of the bracket is inserted in the first pin, and the bottom clamp groove is positioned beneath the car latch, pressed on the car latch by using the first pin as the pivot. The car latch is positioned between the hook and the bottom clamp groove;
   the elastic blocks, fixed at the other end of the bracket.

2. The car latch pedal of claim 1, the car latch pedal is also characterized by:
   a second pin, fixed on the second connecting hole at the other end of the bracket while the elastic blocks are rotationally fixed on the second pin;
   the elastic blocks are equipped with at least two adjusting surfaces for adjusting the horizontal state of the pedal.

3. The car latch pedal of claim 2, the car latch pedal is characterized by two adjusting surfaces, namely a high adjusting surface and a low adjusting surface. The high adjusting surface is further away from the second pin than the low adjusting surface.

4. The car latch pedal of claim 2, the car latch pedal is characterized by multiple elastic holes on elastic blocks; these holes are annularly installed around the axis of the elastic blocks.

5. The car latch pedal of any claims from 1 to 4, the car latch pedal is characterized by adjusting holes with at least two adjusting grooves for adjusting the horizontal state of the pedal.

6. The car latch pedal of claim 5, the car latch pedal is characterized by two adjusting grooves, namely the first adjusting groove and the second adjusting groove which are positioned at the same side of the adjusting holes.

7. The car latch pedal of claim 1, the car latch pedal is characterized by:
   an antiskid plate, with a plurality of antiskid protrusions;
   supporting plates, with bottom clamp groove and the first connecting hole at one end; the supporting plates are symmetrically fixed at both sides of the antiskid plate; the bracket is positioned between the two supporting plates.

8. The car latch pedal of claim 7, the car latch pedal is characterized by an upper hem connected with an antiskid plate on the top of the supporting plates and a lower hem at the bottom of the plates.

9. The car latch pedal of claim 7, the car latch pedal is characterized by the punching tray on the antiskid plate.

10. The car latch pedal of claim 7, the car latch pedal is also characterized by reinforcing plates with a bottom clamp groove and the third connecting hole at one end; the reinforcing plates are fixed at one end of the supporting plates, symmetrically positioned at both sides of the bracket.

* * * * *